US012648024B2

(12) United States Patent
Smith et al.

(10) Patent No.: US 12,648,024 B2
(45) Date of Patent: Jun. 2, 2026

(54) SIGNALED RESTRICTED UORA ACCESS

(71) Applicant: Cisco Technology, Inc., San Jose, CA (US)

(72) Inventors: Malcolm M. Smith, Richardson, TX (US); Brian D. Hart, Sunnyvale, CA (US); Matthew A. Silverman, Shaker Heights, OH (US); Robert E. Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 347 days.

(21) Appl. No.: 18/452,471

(22) Filed: Aug. 18, 2023

(65) Prior Publication Data

US 2024/0381430 A1    Nov. 14, 2024

Related U.S. Application Data

(60) Provisional application No. 63/501,528, filed on May 11, 2023.

(51) Int. Cl.
H04W 74/0833 (2024.01)

(52) U.S. Cl.
CPC .............................. H04W 74/0833 (2013.01)

(58) Field of Classification Search
CPC ............ H04B 7/04013; H04B 7/06952; H04B 7/006952; H04W 72/25; H04L 27/2607
See application file for complete search history.

(56) References Cited

U.S. PATENT DOCUMENTS

2018/0255570 A1* 9/2018 Patil .................... H04W 74/006
2018/0255589 A1  9/2018 Patil et al.

2019/0068271 A1* 2/2019 Lou .................... H04B 7/06952
2019/0090259 A1* 3/2019 Oteri .................... H04W 72/541
2020/0107363 A1  4/2020 Nezou et al.
2022/0191923 A1  6/2022 Li et al.
2022/0272772 A1  8/2022 Ko et al.
2023/0122711 A1  4/2023 Sun et al.

FOREIGN PATENT DOCUMENTS

WO    2022096619 A1    5/2022
WO    2022099706 A1    5/2022
WO    2022115583 A1    6/2022

OTHER PUBLICATIONS

International Search Report and Written Opinion for International Application No. PCT/US2024/027273, mailed Aug. 27, 2024, 16 Pages.

* cited by examiner

*Primary Examiner* — Iqbal Zaidi
(74) *Attorney, Agent, or Firm* — Patterson + Sheridan, LLP

(57) ABSTRACT

A signaling mechanism is provided that includes a restricted random access resource unit (XRA RU) that restricts uplink random access, such as by using Uplink Orthogonal frequency-division multiple access-based Random Access (UORA), to a subset of a plurality of stations that are associated with an Access Point (AP). In one aspect, an AP allocates a resource unit as an XRA RU that restricts uplink random access to a subset of a plurality of stations (STAs) that are associated with the AP. The AP transmits an uplink trigger that includes the XRA RU. The AP restricts use of the XRA RU to the subset of the plurality of STAs. In this way, STAs of the subset can attempt contention-based random access with the XRA RU while other STAs are prevented from attempting random access with the XRA RU.

18 Claims, 7 Drawing Sheets

SIGNALED RESTRICTED UORA ACCESS

CROSS-REFERENCE TO RELATED APPLICATIONS

This application claims benefit of U.S. provisional patent application Ser. No. 63/501,528 filed May 11, 2023. The aforementioned related patent application is herein incorporated by reference in its entirety.

TECHNICAL FIELD

Embodiments presented in this disclosure generally relate to wireless local area networking. More specifically, embodiments disclosed herein relate to a signaling mechanism that includes a restricted random access resource unit that restricts Uplink Orthogonal frequency-division multiple access-based Random Access (UORA) to a subset of a plurality of stations.

BACKGROUND

In IEEE 802.11ax/be/UHR, uplink (UL) access to the medium is through scheduled triggering of traffic that is initiated by an access point (AP). The access model relies on the AP scheduling clients to send uplink traffic at a specified time. However, there are several scenarios where stations (STAs) will not use scheduled/triggered access to the medium (such as a very crowded wireless local access network (WLAN), or cases where a STA urgently needs to transmit and cannot wait for the next available transmit opportunity (TXOP)). In cases such as this, it may be preferable to still use triggers for UL traffic, but the STAs instead have opted for random access to the medium using uplink orthogonal frequency division multiple access (OFDMA)-based random access (UORA). UORA has similar properties to legacy Enhanced Distributed Channel Access (EDCA), where STAs content for access to the medium—with the key difference being that they do not have access to the whole medium, but rather a subset of resource units (RUs) that have been allocated by the AP for random/contention-based access to the medium.

The downside of UORA is that any device may choose to jump on one of the random access RUs and collide with another STA (e.g., classic contention), which is very likely if there are a large number of devices that want to transmit at the same time.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
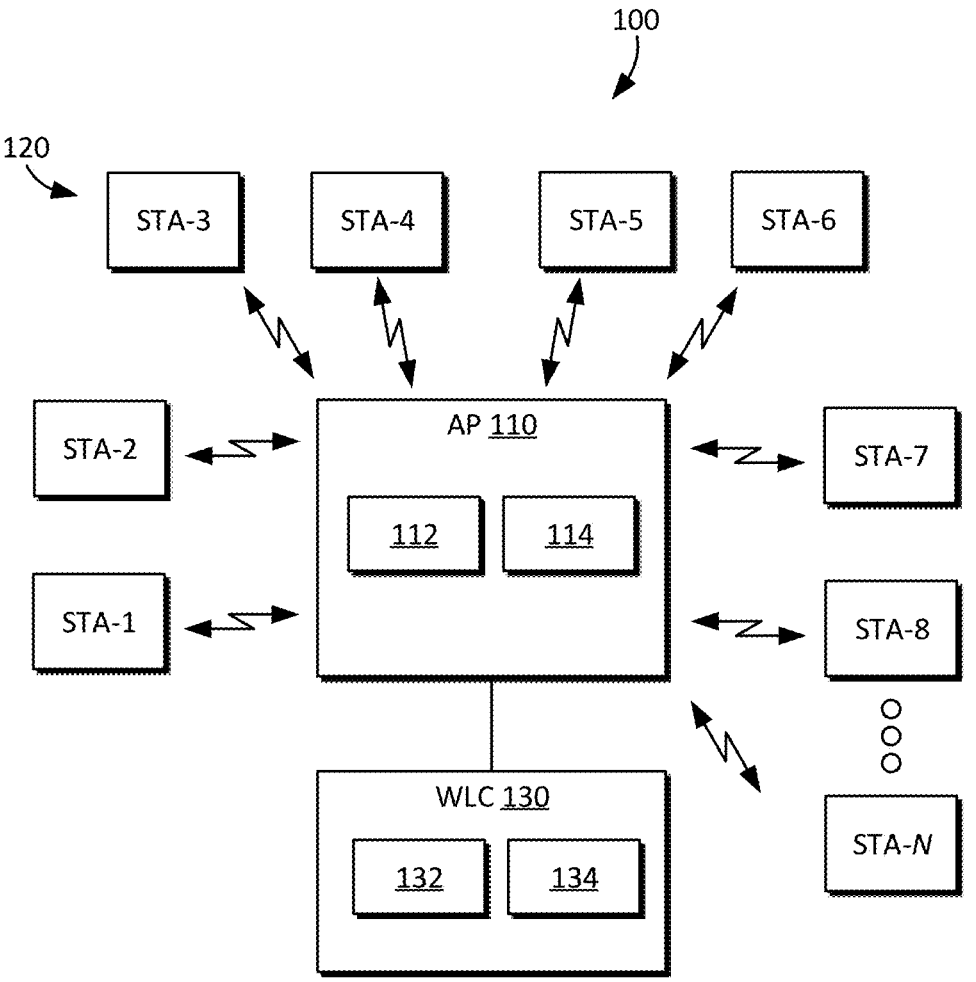
FIG. 1 is a schematic diagram of an example network according to one or more embodiments.

One embodiment presented in this disclosure is a method. The method includes allocating, by an access point (AP), a resource unit (RU) as a restricted random access resource unit (XRA RU) that restricts uplink random access (e.g., using UORA) to a subset of a plurality of stations (STAs) that are associated with the AP. The method also includes transmitting, by the AP to the plurality of STAs, an uplink trigger that includes the XRA RU allocated by the AP. Further, the method includes restricting, by the AP, use of the XRA RU to the subset of the plurality of STAs.

Another embodiment presented in this disclosure is an access point (AP). The AP includes one or more memory devices and one or more processors configured to perform an operation. The operation includes allocating a resource unit (RU) as a restricted random access resource unit (XRA RU) that restricts uplink random access to a subset of a plurality of stations (STAs) that are associated with the AP; causing transmission of an uplink trigger to the plurality of STAs, the uplink trigger including the XRA RU allocated by the AP; and restricting use of the XRA RU to the subset of the plurality of STAs.

Yet another embodiment presented in this disclosure is a non-transitory, computer readable medium. The non-transitory, computer readable medium includes instructions that, when executed by one or more processors associated with an access point (AP), cause the one or more processors to perform an operation. The operation includes allocating a resource unit (RU) as a restricted random access resource unit (XRA RU) that restricts uplink random access to a subset of a plurality of stations (STAs) that are associated with the AP; causing transmission of an uplink trigger to the plurality of STAs, the uplink trigger including the XRA RU; and restricting use of the XRA RU to the subset of the plurality of STAs.

Example Embodiments

The embodiments herein use signaled access to control, not only how many, but which stations (STAs) are permitted to use Uplink Orthogonal Frequency Division Multiple Access (OFDMA)-based Random Access (UORA) to access a medium. Particularly, the embodiments herein augment the UORA procedure for STAs to access a medium in an effort to avoid excessive collisions from pure random access on a per-resource unit basis.

For uplink (UL), STAs communicate their traffic requirements to an Access Point (AP), e.g., by transmitting regular buffer status reports (BSRs). To facilitate this, IEEE 802.11ax supports two modes in which packets can be transmitted in the UL: i) Scheduled Access (SA), in which the AP schedules a set of STAs to transmit on dedicated contention-free Resource Units (RUs), and ii) Random Access (RA) in which, multiple STAs contend to transmit their packet using the exponential backoff-based Distributed Coordination Function (DCF). Currently, any station (STA) can choose to bypass the SA mode of UL transmission to the medium, and can attempt RA with UORA. However, in accordance with inventive aspects of the present disclosure, access to at least one Random Access Resource Unit (RA RU) is restricted by the AP. That is, without explicit approval from an AP, a STA may not use UORA for a particular RA RU. To accomplish this, a signaling mechanism is used between the AP and STA(s) that indicates which STAs are permitted to use UORA for a particular RA RU.

In some aspects, an AP can restrict access to a RA RU to a subset of a plurality of stations that are associated with the AP. For instance, an AP can put each STA into a set that is indicated by a set Identification (ID). When an RU on a triggered uplink is set to RA, the RA for that RU can be constrained to a single set ID. This indicates to the STAs that are engaging in RA to do so on any RU that their set ID was assigned. The mapping of set IDs to RUs can be explicitly signaled in a High Efficiency (HE) UL trigger, e.g., with a newly defined field or reuse of a preexisting field in the trigger, or the mapping can be shown in the beacon and the STAs follow the mapping in the beacon if the RU mapping for a trigger is set to RA.

Accordingly, the embodiments herein define a way for sets of STAs served by an AP to be allocated to a particular RU or set of RUs instead of leaving RA RUs open to all STAs. STAs can be separated into different subsets so that they contend for RA RUs with a smaller and similar group. In this way, Quality of Service (QoS) can be improved for a network.

FIG. 1 is a schematic diagram of an example network 100 according to one or more embodiments. In the depicted embodiment of FIG. 1, the network 100 is configured as an IEEE 802.11 Wireless Local Area Network (WLAN), which can be connected with a Wide Area Network, such as the internet. The network 100 includes at least one Access Point (AP) and a plurality of stations (STAs) (e.g., clients or non-AP STAs). Specifically, the network 100 includes an AP 110 and a plurality of STAs 120 associated with the AP 110. The STAs 120 include a first station STA-1, a second station STA-2, a third station STA-3, a fourth station STA-4, a fifth station STA-5, a sixth station STA-6, a seventh station STA-7, and an eighth station STA-8, but can include any number of STAs as represented by an Nth station STA-N. The AP 110 can manage or wirelessly serve the STAs 120. A given STA can be, without limitation, a smart phone, tablet, laptop, computer, Internet of Things (IoT) device, or any other electronic device configured to communicate wirelessly with the AP 110. In some embodiments, the network 100 can include more or less than eight STAs, such as at least two STAs.

The AP 110 can include one or more memory devices 112 (e.g., one or more non-transitory computer readable medium) and one or more processors 114. The one or more memory devices 112 can include instructions that, when executed by the one or more processors 114, cause the one or more processors 114 to perform an operation, such as generating and causing transmission of a trigger frame that signals, e.g., to the STAs 120, that one or more random access resource units are accessible or restricted for uplink via UORA to a specific subset of the STAs 120. Such operations will be described in detail herein. The AP 110 can be communicatively coupled with a controller, which can be a Wireless Local area network Controller (WLC), or WLC 130. In some instances, the WLC 130 can assist the AP 110 in performing the operation. The WLC 130 can include one or more memory devices 132 (e.g., one or more non-transitory computer readable medium) and one or more processors 134 that can facilitate assistance to the AP 110 in performing the operation.

Figure 2:
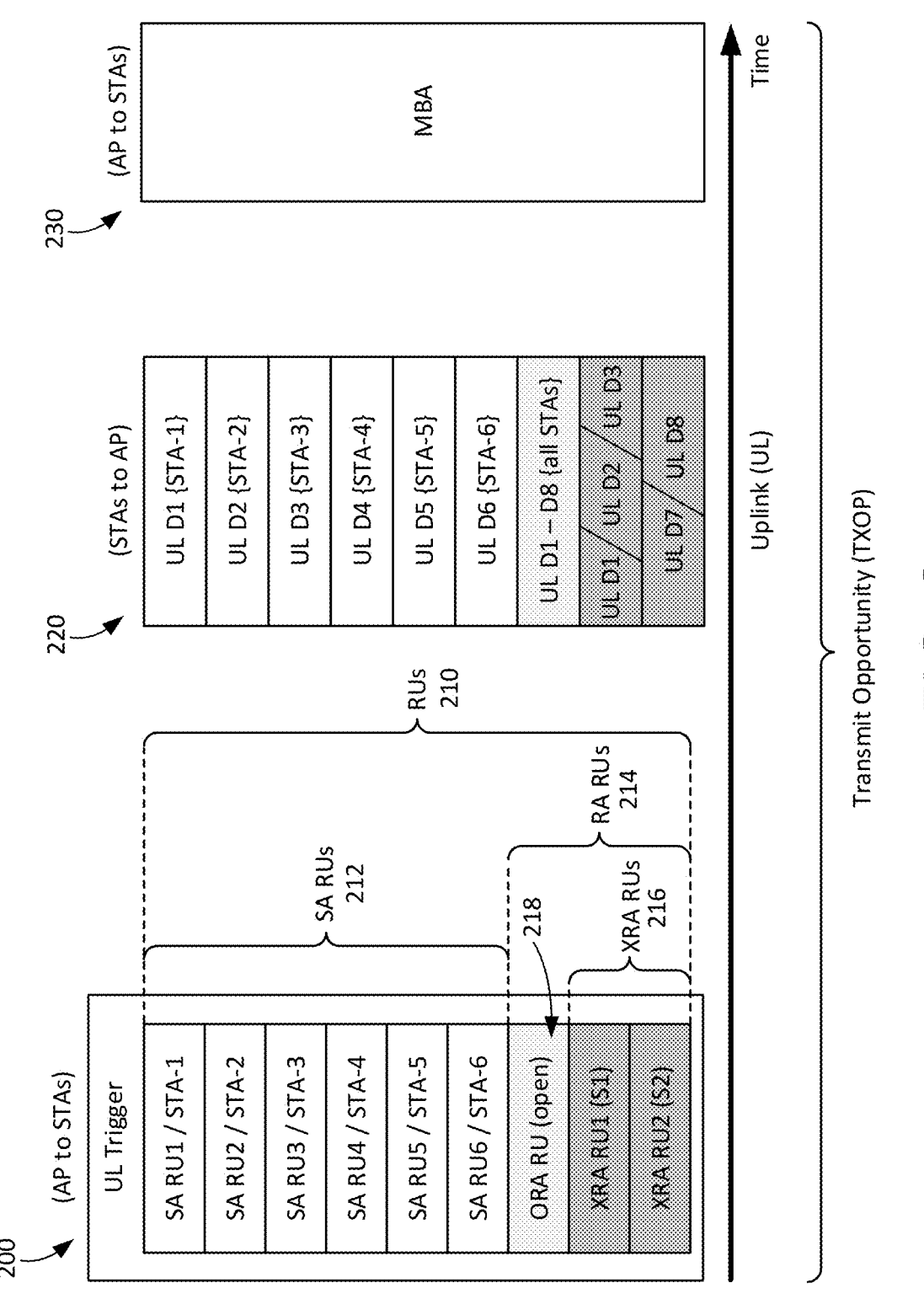
FIG. 2 depicts an example transmit opportunity in which an example uplink trigger is transmitted by an AP, with the UL trigger signaling restricted UORA access to at least one random access resource unit according to one or more embodiments.

FIG. 2 depicts an example transmit opportunity (TXOP) in which an example uplink trigger (or UL trigger 200) is transmitted by an AP, with the UL trigger 200 signaling restricted UORA access to at least one random access resource unit according to one or more embodiments. Generally, the UL trigger 200 is generated by an AP to allocate resources and is transmitted to solicit one or more uplink Physical layer Protocol Data Unit (PPDU) transmissions from STAs associated with the AP (e.g., non-AP STAs associated with the AP).

As illustrated in FIG. 2, the UL trigger 200 includes a plurality of resource units (RUs), or RUs 210. In generating the UL trigger 200, an AP, such as the AP 110 of FIG. 1, can allocate or assign each one of the RUs 210 as a Scheduled Access Resource Unit (SA RU) or a Random Access Resource Unit (RA RU), or rather, as an SA RU 212 or an RA RU 214. Generally, each SA RU 212 can be a dedicated contention-free RU for a particular STA to transmit its uplink data (or UL data) in the uplink. In contrast, each RA RU 214 can provide a resource for STAs to contend with one another to transmit their UL data. In accordance with inventive aspects of the present disclosure, at least one of the RA RUs 214 can be allocated by the AP as a restricted RA RU, designated herein as an XRA RU (or XRA RUs in plural form), which constrains UORA access to a subset of the STAs being served by the AP.

Particularly, for the depicted embodiment of FIG. 2, the UL trigger 200 includes a plurality of RUs 210 allocated by the AP as SA RUs 212, including a first SA RU (or SA RU1) dedicated to a first station STA-1, a second SA RU (or SA RU2) dedicated to a second station STA-2, a third SA RU (or SA RU3) dedicated to a third station STA-3, a fourth SA RU (or SA RU4) dedicated to a fourth station STA-4, a fifth SA RU (or SA RU5) dedicated to a fifth station STA-5, and a sixth SA RU (or SA RU6) dedicated to a sixth station STA-6. These SA RUs 212 offer their respective STAs dedicated contention-free resources to uplink their respective UL data. Accordingly, during an uplink 220 as shown in FIG. 2, the first station STA-1 can uplink first uplink data UL D1 to SA RU1, the second station STA-2 can uplink second uplink data UL D2 to SA RU2, the third station STA-3 can uplink third uplink data UL D3 to SA RU3, the fourth station STA-4 can uplink fourth uplink data UL D4 to SA RU4, the fifth station STA-5 can uplink fifth uplink data UL D5 to SA RU5, and the sixth station STA-6 can uplink sixth uplink data UL D6 to SA RU6. In other embodiments, the AP can allocate more or less than six SA RUs in the UL trigger 200.

In addition, the UL trigger 200 includes a plurality of RUs 210 allocated by the AP as RA RUs 214. For the illustrated embodiment of FIG. 2, the RA RUs 214 include one RA RU that is an "open" RA RU, or ORA RU 218. The ORA RU 218 is open to all STAs associated with the AP for contention-based UORA access and is not restricted to any particular subset of STAs. In some alternative embodiments, the UL trigger 200 can include more or less than one ORA RU. The RA RUs 214 allocated by the AP also include at least one XRA RU that restricts UORA access to a subset of the STAs associated with the AP. Specifically, as illustrated in FIG. 2, the UL trigger 200 includes a first XRA RU, or XRA RU1, that restricts UORA access to a first subset S1 of the STAs. The UL trigger 200 also includes a second XRA RU, or XRA RU2, that restricts UORA access to a second subset S2 of the STAs. In some embodiments, the UL trigger 200 can include more or less than two XRA RUs. The first subset S1 can include the same or different STAs than the second subset S2.

As a first example, an AP can have eight total STAs associated therewith, e.g., as in FIG. 1. The first subset S1 associated with XRA RU1 can include the first station STA-1, the second station STA-2, and the third station STA-3 while the second subset S2 associated with XRA RU2 can include the seventh station STA-7 and the eighth station STA-8. Accordingly, for the first example, contention-based UORA access with the XRA RU1 is restricted to only the first, second, and third stations STA-1, STA-2, STA-3, while contention-based random access with the XRA RU2 using UORA is restricted to only the seventh and eighth stations STA-7 and STA-8. In this regard, subsets associated with different XRA RUs 216 can include different STAs than one another. In the first example, all eight STAs would be eligible to contend for random access with the ORA RU 218 using UORA. Accordingly, during the uplink 220 as shown in FIG. 2, the first station STA-1, the second station STA-2, and the third station STA-3 can contend with one another to uplink their respective uplink data UL D1, UL D2, UL D3 to XRA RU1 using UORA while the seventh station STA-7 and the eighth station STA-8 can contend with one another to uplink their respective uplink data UL D7, UL D8 to XRA RU2 using UORA. In this way, the AP restricts random access using UORA to only the designated STAs during the uplink 220. Moreover, all STAs can contend with one another to uplink their respective uplink data to ORA RU using UORA. As further illustrated in FIG. 2, after the uplink 220, the AP can transmit a Multi-station Block Acknowledgement (MBA) that confirms to the STAs that the AP has received their uplink data.

As a second example, an AP can have eight total STAs associated therewith, e.g., as in FIG. 1. The first subset S1 associated with XRA RU1 can include the first station STA-1, the second station STA-2, and the third station STA-3 while the second subset S2 associated with XRA RU2 can include the first station STA-1, the fifth station STA-5, and the sixth station STA-6. Accordingly, for the second example, contention-based UORA access to the XRA RU1 is restricted to only the first, second, and third stations STA-1, STA-2, STA-3, while contention-based UORA access to the XRA RU2 is restricted to only the first, fifth, and sixth stations STA-1, STA-5, STA-6. In this regard, in some embodiments, a STA associated with the AP can be a member of or included in more than one subset (e.g., the first station STA-1 is a member of the first subset S1 and a member of the second subset S2 in the second example). In the second example, all eight STAs would be eligible to contend for the ORA RU 218.

In some embodiments, the AP can assign or group STAs into a subset based at least in part on one or more Quality of Service (QoS) factors or considerations.

As one example, the subset of STAs designated to contend for RA on an XRA RU using UORA can be established such that STAs of the subset are unlikely to have traffic at a same time relative to one another. For instance, the AP can determine when STAs associated therewith are scheduled to send their respective data over the medium, and based on this timing, the AP can schedule or assign certain STAs to the subset. Accordingly, in some embodiments, the STAs included as members in the subset can be based at least in part on a timing of traffic of the STAs. This can improve the performance or QoS of a network.

As another example, the subset of STAs designated to contend for RA on an XRA RU using UORA can be established such that STAs in the subset have different classes of traffic relative to one another. For instance, the AP can determine STAs that have different classes of traffic relative to one another and can group them into a subset. Traffic to be uplinked by a STA can be classified by traffic type, e.g., by Voice (VO), Video (VI), Best Effort (BE), and Background (BK), by priority level, by criticality, etc. Arranging STAs in subsets by different traffic classes can improve the performance or QoS of a network.

As a further example, the subset of STAs designated to contend for RA on an XRA RU using UORA can be established so that a traffic load of a WLAN is uniformly spread, to an extent possible, over a plurality of resource units, which includes the one or more allocated XRA RUs. For instance, an AP can determine its traffic load capability and the traffic load associated with SA RUs for an upcoming period, and based on these considerations, the AP can assign STAs to one or more subsets in an effort to balance the traffic load. This can improve the performance or QoS of a network.

As yet another example, the subset of STAs designated to contend for RA on an XRA RU using UORA can be established based at least in part on one or more learned traffic patterns associated with the WLAN. The learned traffic patterns can be machine-learned traffic patterns, for example. The AP and/or a WLC associated with the AP can use one more machine-learning techniques, supervised or unsupervised, to learn the traffic patterns of the WLAN. For instance, based at least in part on the learned traffic patterns, the AP and/or WLC can recognize that it would be particularly advantageous to make certain STAs members of a subset for one or more particular transmission opportunities, e.g., in an effort to improve QoS of the network.

In some further examples, the subset of STAs designated to contend for RA on an XRA RU using UORA can be established based at least in part on any combination of the above-noted one or more QoS considerations or factors.

In some embodiments, an AP can assign or group STAs into a subset indicated by a set identification, or set ID. When an RU on an UL trigger is set to restricted random access, the random access for that RU can be constrained to a single set ID, or in some instances, multiple set IDs. A set ID indicates to the STAs that are engaging in random access to do so on any RU that their set ID was assigned.

In some embodiments, the mapping of STAs to set IDs can be signaled in a UL trigger, such as a High Efficiency (HE) UL trigger, with a newly defined field or reuse of a preexisting field in the trigger (e.g., a user information field). Similarly, the mapping of set IDs to RUs can be signaled in the UL trigger within the newly defined field or within a preexisting field in the UL trigger. Examples of such UL triggers are provided below.

Figures 3, 4:
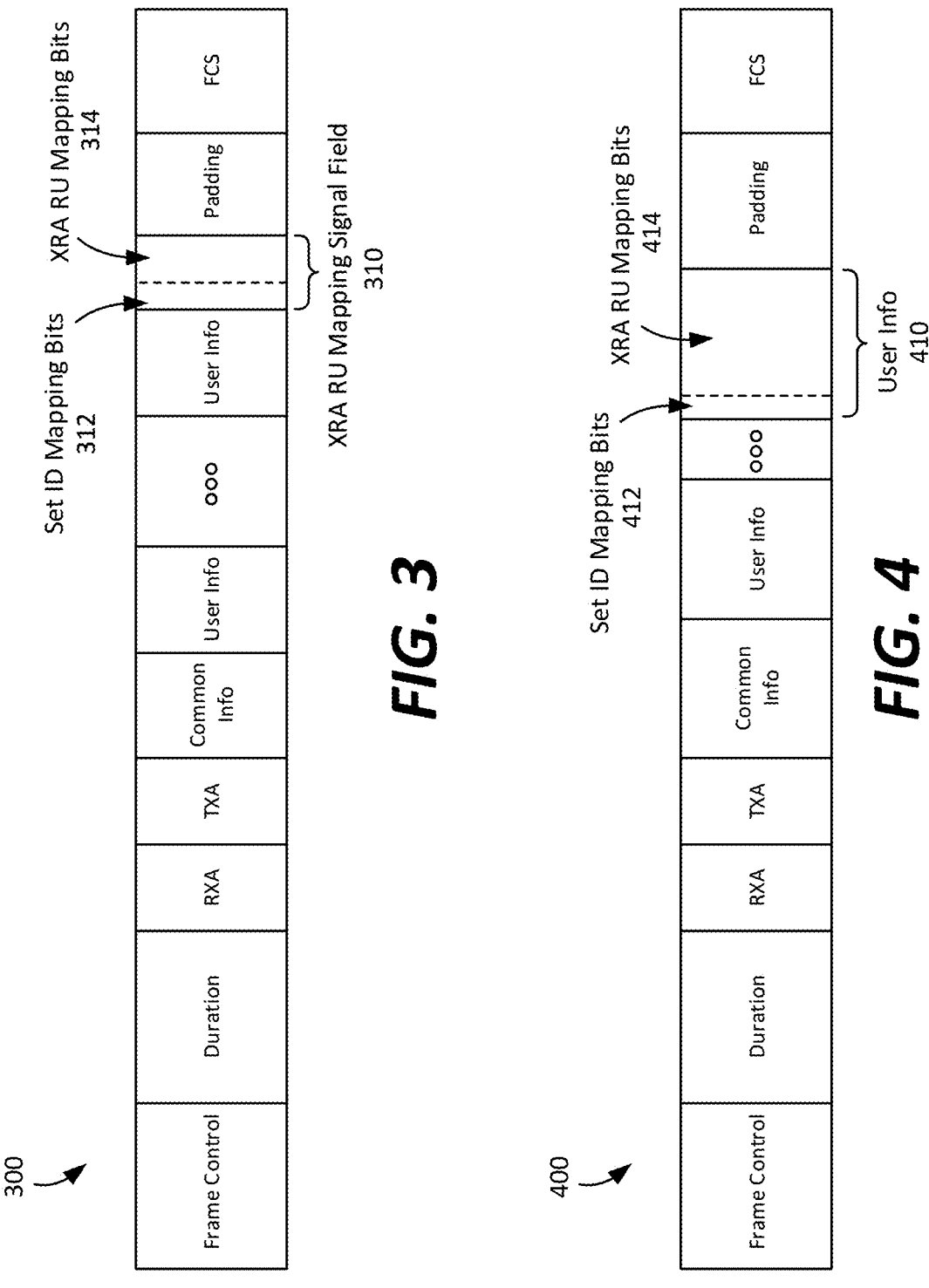
FIG. 3 depicts one example UL trigger that includes a newly defined field that includes one or more set identification (ID) mapping bits and one or more restricted random access resource unit (XRA RU) mapping bits.
FIG. 4 depicts another example UL trigger that includes one or more set ID mapping bits and one or more XRA RU mapping bits located within a preexisting field in the UL trigger.

FIG. 3 depicts one example UL trigger 300 that includes a newly defined field, denoted as an XRA RU mapping signal field 310 in FIG. 3. In addition to the XRA RU mapping signal field 310, the UL trigger 300 also includes a frame control field (denoted as Frame Control in FIG. 3), a duration field (denoted as Duration in FIG. 3), a receiver address field (denoted as RXA in FIG. 3; e.g., a broadcast address), a transmission address field (denoted as TXA in FIG. 3; an address of the AP transmitting the UL trigger 300), a common information field (denoted as Common Info in FIG. 3), a user information field (denoted as User Info in FIG. 3), a padding field (denoted as Padding in FIG. 3), and a Frame Check Sequence (FCS) field (denoted as FCS in FIG. 3). Such fields are generally known and thus will not be described in detail herein. In FIG. 3, the XRA RU mapping signal field 310 is located between the user information field and the padding field but can be located in other locations in other example embodiments.

The newly defined field, or XRA RU mapping signal field 310, includes one or more bits that signal mapping of STAs to set IDs, denoted as set ID mapping bits 312 in FIG. 3. The set ID mapping bits 312 can map a subset of the STAs associated with the AP to a set ID. For example, a first, second, and third STA can be mapped to a first set ID; a fourth, fifth, and sixth STA can be mapped to a second set ID, a seventh and eighth STA can be mapped to a third set ID; and the first and eighth STA can be mapped to a fourth set ID, and so on. The set ID mapping bits 312 function to indicate to the STAs the subsets, if any, to which they belong. In some embodiments, the subsets to which the STAs are assigned can be fixed, e.g., from one transmission opportunity to the next. In yet other embodiments, the subsets to which the STAs are assigned can be varied, e.g., from one transmission opportunity to the next. The subsets can be varied from one transmission opportunity to the next, e.g., based at least in part on one or more QoS considerations or factors associated with the network. In some further embodiments, the subsets to which the STAs are assigned can be varied during a single transmission opportunity, e.g., based at least in part on a changed status of a STA that the AP recognizes as being critical traffic, such as an emergency 911 call.

The XRA RU mapping signal field 310 also includes one or more bits that signal mapping of set IDs to RA RUs, denoted as XRU RA mapping bits 314 in FIG. 3. The XRU RA mapping bits 314 can map set IDs to respective RUs. FIG. 2 provides an example of such mapping, wherein the first subset S1 having a first set ID is mapped to the XRA RU1 and the second subset S2 having a second set ID is mapped to the XRA RU2.

FIG. 4 depicts another example UL trigger 400 that includes one or more set ID mapping bits 412 and one or more XRU RA mapping bits 414 located within a preexisting field in the UL trigger 400. For the depicted embodiment of FIG. 4, the one or more set ID mapping bits 412 and the one or more XRU RA mapping bits 414 are located in the user information field 410, which is a preexisting field. The one or more set ID mapping bits 412 can be co-located with the one or more XRU RA mapping bits 414 in the same user information block, e.g., as shown in FIG. 4. Alternatively, the one or more set ID mapping bits 412 and the one or more XRU RA mapping bits 414 can be located in separate user information blocks. In other embodiments, the one or more set ID mapping bits 412 and/or the one or more XRU RA mapping bits 414 can be located in other preexisting fields on the UL trigger 400. As one example, the one or more set ID mapping bits 412 can be located in the common information field while the one or more XRU RA mapping bits 414 can be located in the user information field 410.

In yet other example embodiments, a beacon transmitted by an AP can include one or more set ID mapping bits and/or one or more XRU RA mapping bits. In such embodiments, the STAs can follow the mapping in the beacon when a UL trigger subsequently transmitted by the AP allocates a given RU as a XRA RU. An example of such a beacon is provided below.

Figure 5:
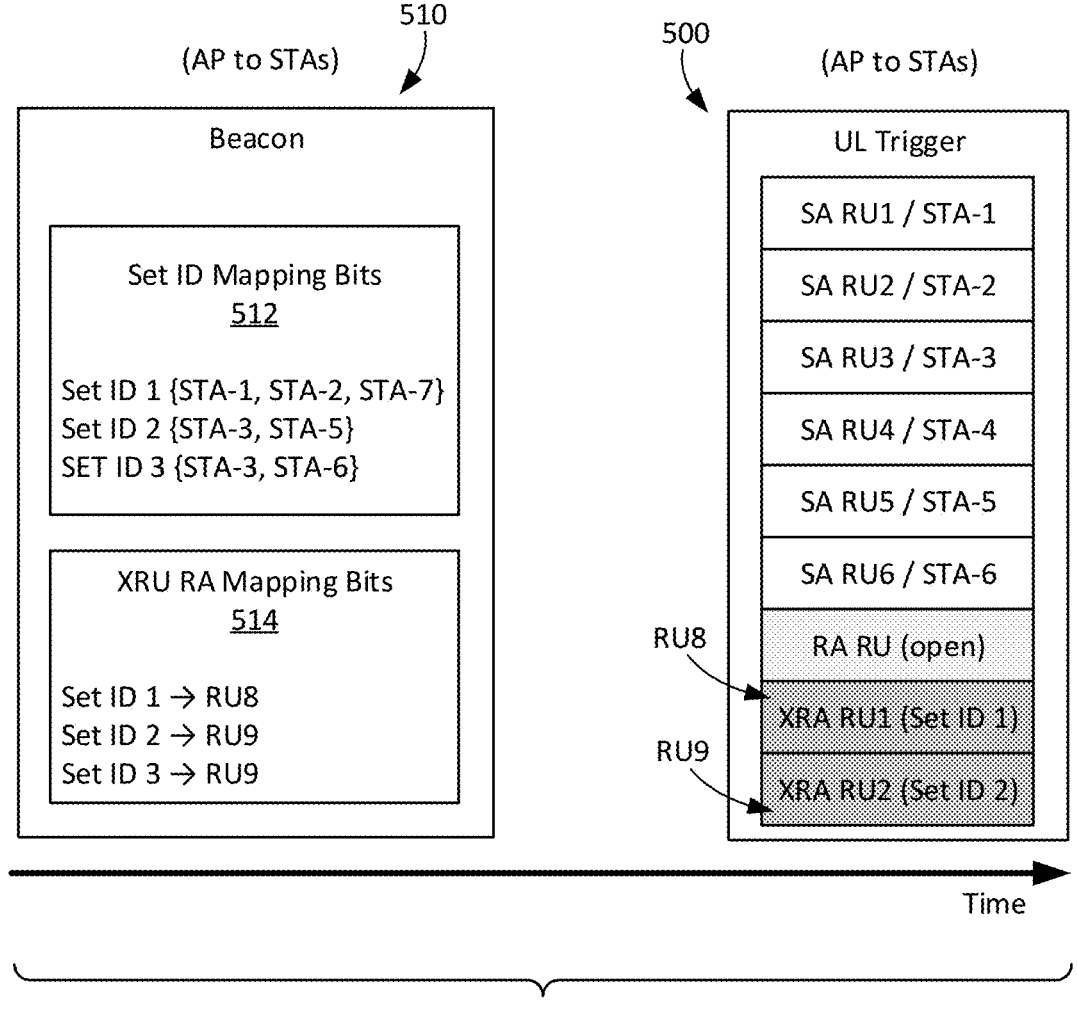
FIG. 5 depicts an example transmission opportunity in which a beacon is transmitted by an AP with a UL trigger transmitted by the AP at a subsequent time.

FIG. 5 depicts an example transmission opportunity in which a beacon 510 is transmitted by an AP with a UL trigger 500 transmitted by the AP at a subsequent time. As shown, the beacon 510 includes one or more set ID mapping bits 512, which map STAs to set IDs as noted above. The beacon 510 also includes one or more XRU RA mapping bits 514, which map set IDs to RUs. In such embodiments, when the AP allocates a given RU as an XRA RU as indicated in the UL trigger 500, the mapping provided in the beacon 510 can be followed. In this way, the UL trigger 500 can indicate to the STAs which of them are permitted to attempt UORA access with the XRA RU.

For instance, as depicted in FIG. 5, the one or more set ID mapping bits 512 of the beacon 510 can map a first subset of STAs to a first set ID (e.g., STA-1, STA-2, and STA-7 are mapped to Set ID 1), a second subset of STAs to a second set ID (e.g., STA-3 and STA-5 are mapped to Set ID 2), and a third subset of STAs to a third set ID (e.g., STA-3 and STA-6 are mapped to Set ID 3). The one or more XRA RU mapping bits 514 of the beacon 510 can map: the first set ID to a resource unit (e.g., Set ID 1 is mapped to an eighth resource unit RU8), the second set ID to a resource unit (e.g., Set ID 2 is mapped to a ninth resource unit RU9), and the third set ID to a resource unit (e.g., Set ID 3 is mapped to the ninth resource unit RU9). Accordingly, when the UL trigger 500 allocates the eighth resource unit RU8 as an XRA RU (e.g., XRA RU1), the mapping provided in the beacon 510 is followed. That is, the eighth resource unit RU8 is allocated as an XRA RU that permits UORA access to the STAs associated with the first set ID (e.g., STA-1, STA-2, and STA-7), or stated differently, UORA access to the eighth resource unit of the AP is restricted to only STAs associated with the first set ID. Moreover, when the UL trigger 500 allocates the ninth resource unit RU9 as an XRA RU (e.g., XRA RU2), the mapping provided in the beacon 510 is followed, but in this instance, the AP has assigned set ID 2 to the ninth resource unit RU9 over set ID 3, e.g., based on a determination that set ID 2 has priority over set ID 3. In this regard, the ninth resource unit RU9 is allocated as an XRA RU that permits UORA access to the STAs associated with the second set ID (e.g., STA-3 and STA-5), or stated another way, UORA access to the ninth resource unit is restricted to only STAs associated with the second set ID. It will be appreciated that one or more transmissions between the STAs and the AP can occur between the beacon 510 and the UL trigger 500.

In yet other example embodiments, subsets of STAs associated with respective set IDs (or the mapping thereof) can be defined via unicast exchanges that take place prior to transmission of a UL trigger by the AP. The mapping set forth in the unicast exchanges can be followed by the STAs in accordance with the RU allocation set forth in the UL trigger, e.g., in a similar manner as described above in which the mapping in the beacon 510 can be followed by the STAs in accordance with the RU allocation set forth in the UL trigger 500.

In some further embodiments, an AP can advertise a scheduled access status for an upcoming period as well as a restricted access indicator that specifies or foreshadows at least one attribute associated with the STAs to be included in the subset that will be permitted to contend for random access using UORA with an XRA RU that is set to be allocated in an upcoming period, e.g., in an upcoming UL trigger. Example attributes include, without limitation, a traffic type of data to be uplinked by a STA, an Association Identifier (AID) associated with a STA, and/or a Media Access Control (MAC) address of a STA, etc. Such schemes can enhance the Quality of Service (QoS) of a network by allowing STAs to make decisions about whether SA or RA would best allow them to uplink their data to the medium, among other benefits.

As a first example, an AP can issue a beacon, a Buffer Status Report Poll (BSRP) trigger, or both, that can include a scheduled access status for an upcoming period. The beacon and/or BSRP trigger can include an Information Element (IE), new control field bits, etc. that can define the schedule access status in an upcoming period. The scheduled access status can indicate which RUs in an upcoming UL trigger are going to be allocated for scheduled access and which STAs are going to be assigned to the allocated SA RUs. In addition, a beacon, a BSRP trigger, or both, issued by the AP can include a restricted access indicator in the form of a Traffic Identifier (TID), which indicates that STAs with a type of traffic identified in the TID are set to be included in a subset that will be permitted to contend for random access using UORA with an XRA RU that is set to be allocated in an upcoming period, e.g., in an upcoming UL trigger.

Figure 6:
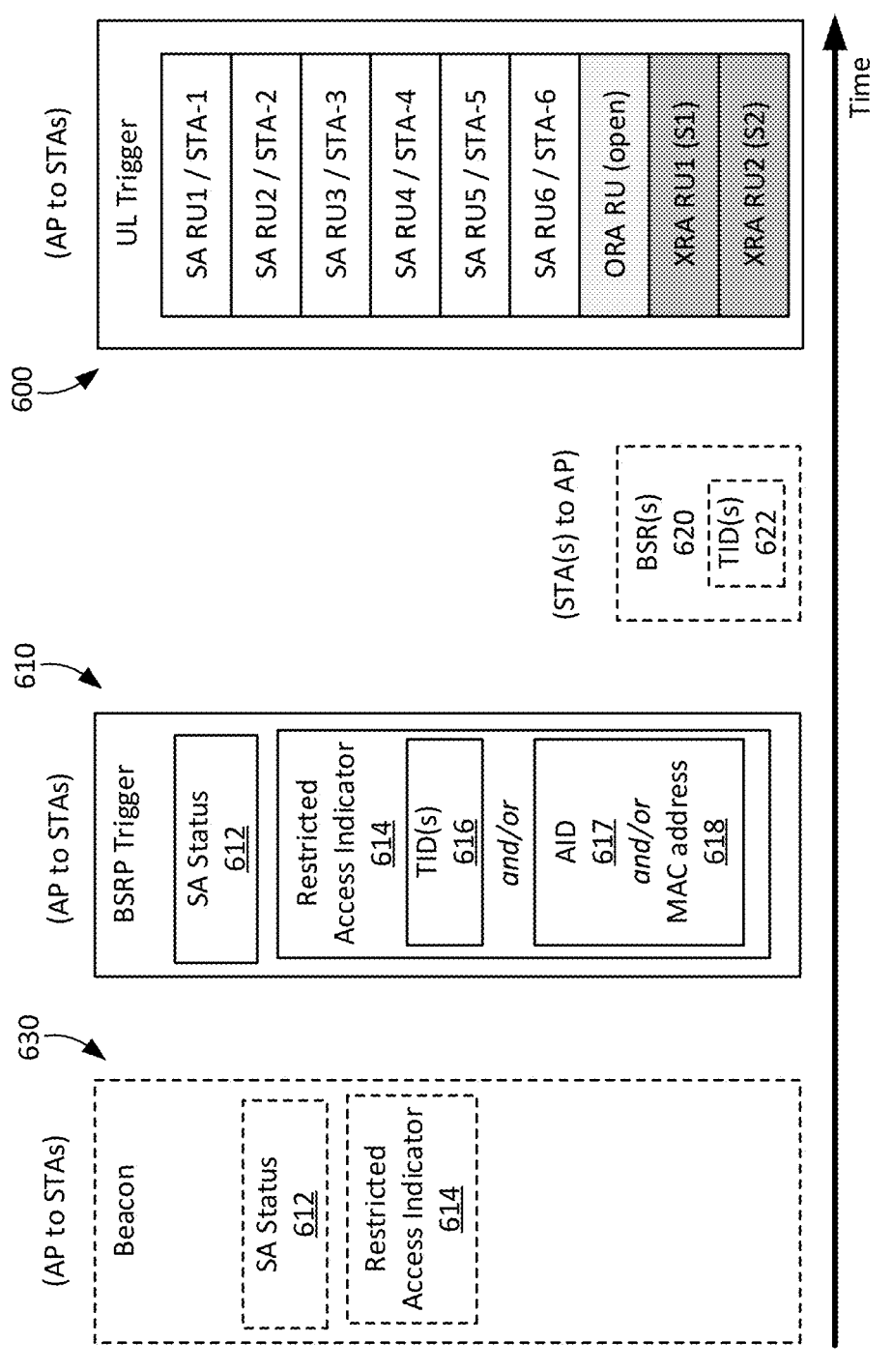
FIG. 6 depicts an example transmission opportunity in which a scheduled access status in a buffer status report poll trigger indicates that certain resource units are going to be allocated for scheduled access in an upcoming UL trigger.

For instance, FIG. 6 depicts an example transmission opportunity in which a scheduled access status 612 in a BSRP trigger 610 can indicate that RUs one through six (SA RU1 through SA RU6) are going to be allocated as SA RUs in the upcoming UL trigger 600 with STAs one through six (STA-1 through STA-6) being dedicated or assigned to the SA RUs, respectively. In FIG. 6, the BSRP trigger 610 includes a restricted access indicator 614 embodied as a TID 616. Accordingly, when a given STA of the plurality of STAs has uplink data to send in the upcoming period that matches the TID 616 set forth in the BSRP trigger 610, the AP can assign the STA to a subset associated with an XRA RU in the upcoming period, such as the first subset S1 that is assigned to XRA RU1 in FIG. 6. A given STA can communicate that its uplink data has a TID 622 matching the TID 616 set forth in the BSRP trigger 610, e.g., by way of a Buffer Status Report (BSR), or BSR 620, as shown in FIG. 6. The STAs having TIDs that match the TID in the BSRP trigger 610 can then make decisions about whether they wish to try for SA with an SA RU, if available, or if they wish to contend for UORA access to an XRA RU in an upcoming period (or another RA RU) to access the medium. This may advantageously allow STAs with the type of traffic associated with the TID to perform UORA on an XRA RU, regardless of the RU state or traffic type, e.g., regardless of whether the traffic type is Voice (VO), Video (VI), Best Effort (BE), or Background (BK). This advantageously can push certain STAs with traffic of a certain type (or TID type) toward an RA mode rather than waiting, in some instances excessively long, for the next triggered TXOP. In other embodiments, optionally, the scheduled access status 612 and/or restricted access indicator 614 can be included in a beacon 630 issued by the AP, e.g., as shown in FIG. 6. In some embodiments, one of the scheduled access status 612 and the restricted access indicator 614 can be included in the beacon 630 and the other can be provided in the BSRP trigger 610.

As a second example, an AP can advertise a scheduled access status for an upcoming period as in the example above but can provide a restricted access indicator in the form of a TID or TIDs (or a single TID priority level indicator) indicating one or more traffic types that are to receive a predetermined priority level in the upcoming period. When a given station of the plurality of STAs has uplink data to send in the upcoming period that is a traffic type that reaches the predetermined priority level, e.g., as indicated in a BSR sent to the AP by a given STA, the station can be included in a subset associated with access to an XRA RU in the upcoming period. In such an example, different types of traffic can be ranked or prioritized according to a priority level scheme, which may be fixed or may be variable depending on network needs. As one example traffic ranking, the traffic types VO, VI, BE, BK can be ranked as follows: VO is a tier 1 priority level, VI is a tier 2 priority level, BE is a tier 3 priority level, and BK is a tier 4 priority level. Accordingly, when the TID or TID priority level indicator embodied as the restricted access indicator is provided as VI, which is a tier 2 priority level, all STAs with traffic to send having a priority level that reaches tier 2 (e.g., STAs having VI and VO) can be included in a subset of STAs that can contend for access to an XRA RU via UORA in the upcoming period. It will be appreciated that other traffic type rankings are possible. For instance, as another example traffic ranking, VO, VI, BE, BK can be ranked as follows: BK is a tier 1 priority level, BE is a tier 2 priority level, VI is a tier 3 priority level, and VO is a tier 4 priority level. Other types of traffic are also contemplated.

As a third example, an AP can advertise a scheduled access status for an upcoming period as in the examples above but can provide a restricted access indicator in the form of an AID, a MAC address, or both. As shown in FIG. 6, the BSRP trigger 610 the restricted access indicator 614 can be embodied as an AID 617 and/or MAC address 618. An AID is a unique identifier, typically in number form, which identifies an association between an AP and a STA. A MAC address is a unique identifier, typically in alphanumeric form, which identifies an individual STA on a network. Accordingly, when an AP issues a beacon, a BSRP, or both, that provide an AID or MAC address, or both, the AP can signal, on a per-STA basis, which STAs are going to be included in a subset of STAs that can contend for access to an XRA RU via UORA in the upcoming period. This advantageously can allow STAs having AIDs and/or MAC addresses that match the signaled AIDs and/or MAC addresses to make decisions about whether they wish to try for SA with an SA RU, if available, or if they wish to contend for UORA access to an XRA RU in an upcoming period (or another RA RU) to access the medium.

In some instances, a "Next TWT" can be set to a value that invalidates an upcoming scheduled Target Wake Time (TWT) Service Period (SP), or TWT SP, or a "SCS Modify" of a Stream Classification Service (SCS) can be modified, thus allowing allocation to SA vs. RA model on a per-STA basis.

By way example, an AP can invalidate an upcoming scheduled TWT SP to entice a STA to use the RA mode, such as UORA. For instance, a "Next TWT" field of a beacon (or a TWT Response or TWT IE) issued by the AP can be used to invalidate the upcoming scheduled TWT SP. For example, the "Next TWT" field can be set to zero, infinity, or as appropriate to achieve invalidation of the upcoming scheduled TWT SP. The invalidation scheme can be carried out for explicit TWT. For implicit TWT, where STAs implicitly compute their respective Next TWT, TWT agreement signaling can be used to suspend the current TWT agreement. For both explicit and implicit TWT, signaling occurs while the STAs are awake (e.g., after a beacon is issued or during a current TWT SP) and advance knowledge of the SA status of the STAs is computed. In yet other embodiments, such as for 802.11be SCS applications, an AP can invalidate a period or start time so that STAs know that there is no upcoming scheduled TXOP for them. For instance, a "SCS Modify" of an SCS Response from an AP can be used to alter the traffic delivery schedule via one or more revised QoS characteristic IEs (e.g., traffic period, delivery start time, etc.). A period or start time can be invalidated (e.g., by setting values to infinity) so the STAs can be informed that there is no upcoming scheduled TXOP for them, which can entice STAs to use the RA mode, such as UORA.

As a fourth example, an access point can advertise a scheduled access status for an upcoming period as in the examples above but can provide a restricted access indicator in the form of an AID, MAC address, or both, and a TID. In this regard, a given STA can be informed as to whether it will be permitted to contend for UORA access for an XRA RU that is set to be allocated in an upcoming period, e.g., in an upcoming UL trigger, based on its traffic type and its AID and/or MAC address, which may provide more information for the given STA to make a decision as to whether SA or RA would best allow them to uplink their data to the medium.

In yet other embodiments, an AP can determine a function or a usage, or both, of a STA. The AP can then determine a criticality level of the STA based at least in part on the function or the usage, or both. The AP can determine whether the STA would be better served in SA or RA using UORA based at least in part on the criticality level of the STA.

For instance, when the STA is at or above the criticality level, the AP can provide the STA access to an SA RU dedicated to the STA and can forego including the STA in a subset of STAs that can contend for RA to an XRA RU using UORA. That is, because the STA has a certain criticality, the AP gives the STA preferential treatment and allocates an RU as an SA RU dedicated to the STA. In contrast, when the STA is below the criticality level, the AP includes the STA in a subset of STAs that can contend for RA to an XRA RU using UORA. Thus, less critical STAs can be pushed toward an RA mode. In some embodiments, the AP can determine a function or a usage, or both, of a given STA based at least in part on information acquired by the AP during an association or re-association exchange between the AP and the given STA, during an authentication or re-authentication exchange between the AP and the given STA, during a Basic Service Set Identifier (BSSID)-specific probe, and/or related management exchanges between the AP and the given STA, among other possibilities.

In some further embodiments, an AP can determine user group-based requirements of a STA. The AP can then determine whether the STA would be better served in SA or RA using UORA based at least in part on the user group-based requirements of the STA. In this way, whether a STA is included in a subset of STAs that can contend for RA to an XRA RU using UORA can be based at least in part on the user group-based requirements of the STA. Example user group-based requirements of a STA include, without limitation, multicast, IEEE MAC-address based and/or Internet Protocol (IP)/Internet Group Management Protocol (IGMP)), or Multi-User (MU) (e.g., an AID set) in making a determination whether a STA would be better served in an RA or SA model.

In still further embodiments, an AP can determine whether a STA would be better served in SA or RA using UORA based at least in part on an AID or MAC, or both, of the STA. Such a scheme can be advantageous particularly in scenarios where a STA is known or determined to be critical, such as a STA that is used for emergency communications, e.g., 911 calls. For instance, an AP can determine that a given STA is responsible for sending critical flows, and as a result, the AP can allocate an SA RU dedicated to the STA. In contrast, an AP can determine that a given STA is not responsible for sending critical flows, and consequently, the AP can include the given STA as a member of a subset of STAs that can contend for access to an XRA RU via UORA.

In some embodiments, when a status of a STA has changed and the STA appears to have critical traffic to uplink, the AP can send an updated transmission (e.g., an updated beacon or trigger) indicating that the STA is being moved from a RA mode to an SA mode so that the STA can uplink its critical traffic on a dedicated resource unit rather than a contention-based RA RU or XRA RU. An example is provided below.

Figure 7:
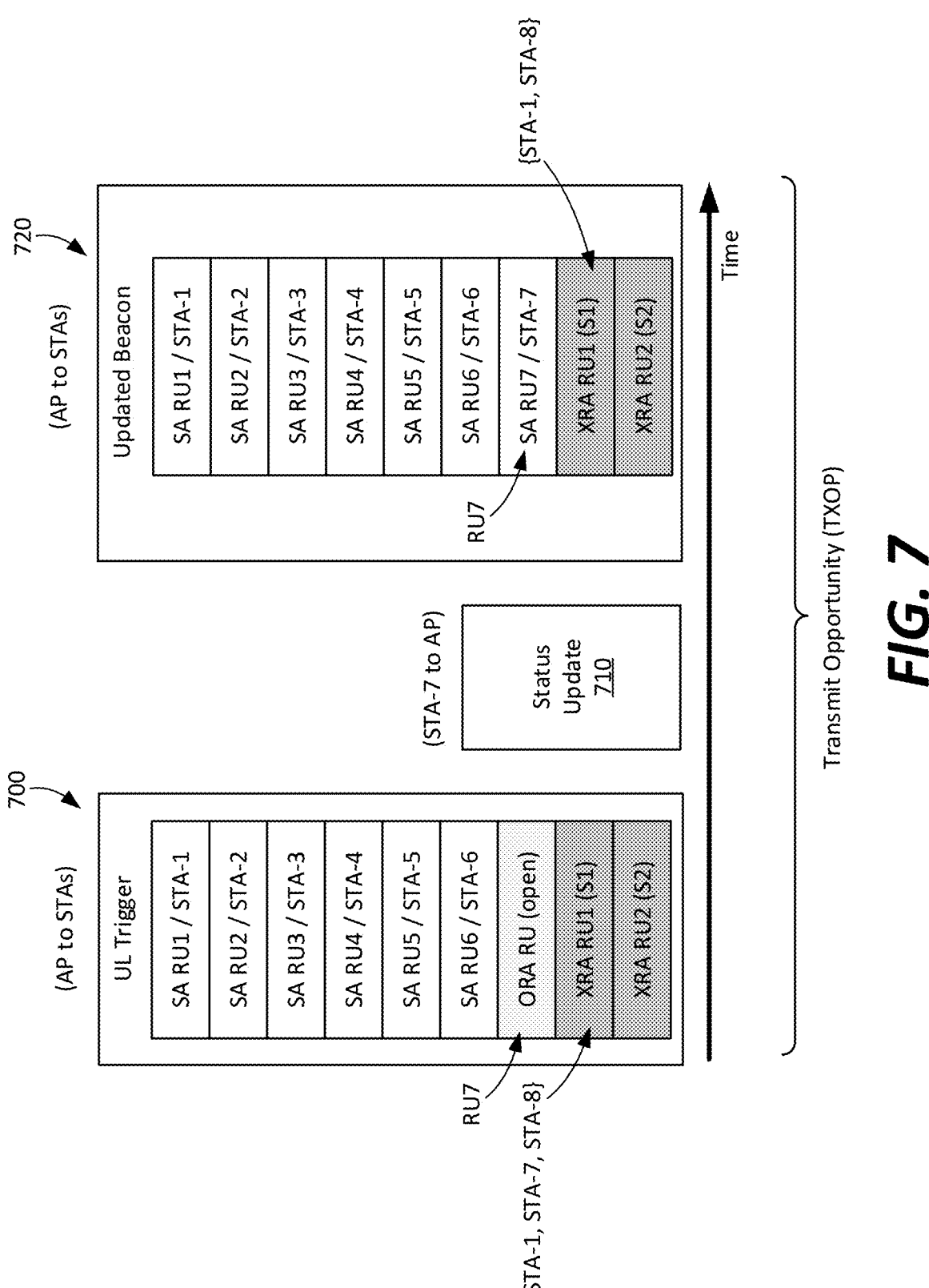
FIG. 7 depicts an example transmit opportunity in which a UL trigger is transmitted by an AP, a status update is transmitted to the AP, and a subsequent transmission is issued by the AP with updated information.

FIG. 7 depicts an example transmit opportunity TXOP in which a UL trigger 700 is transmitted by an AP, a status update 710 is then transmitted to the AP, and a subsequent transmission is issued by the AP with updated information. Particularly, as shown in FIG. 7, the UL trigger 700 indicates that XRA RU1 is allocated to a first subset S1 of STAs that includes a first station STA-1, a seventh station STA-7, and an eight station STA-8. Then, the seventh station STA-7 transmits a status update 710 to the AP indicating that it has a status change. More particularly, the status update 710 sent to the AP by the seventh station STA-7 can indicate that seventh station STA-7 has traffic to transmit that has a greater criticality level than previously determined (e.g., the traffic the seventh station STA-7 wishes to send can be changed to a type of traffic deemed critical for emergency purposes. In this regard, the AP can determine that the status of the seventh station STA-7 has changed and that action is needed to ensure that the seventh station STA-7 is able to uplink its data in the current transmit opportunity TXOP.

Accordingly, the AP can reallocate resource units to accommodate the seventh station STA-7 and can issue an updated transmission, such as updated beacon 720 or trigger, which indicates that the seventh STA-7 is being removed from the first subset S1 and that a SA RU is being allocated to the seventh STA-7. As illustrated in the updated beacon 720 in FIG. 7, the seventh station STA-7 is removed from subset S1 and the seventh resource unit RU7 has been allocated as a SA RU, noted as SA RU7 in FIG. 7. Accordingly, in view of the status change of the seventh station STA-7, the ORA RU allocated to the seventh resource unit RU7 in the UL trigger 700 has been reallocated for scheduled access as SA RU7 dedicated to the seventh station STA-7. Such a scheme can enable a STA with traffic associated with an emergency to be given preferential treatment as soon as possible, e.g., by immediately switching the STA from an RA mode to an SA mode.

In yet other embodiments, when a status of a STA has changed and the STA appears to have less critical traffic to uplink than previously determined, the AP can send an updated transmission (e.g., an updated beacon or trigger) indicating that the STA is being moved from an SA mode to an RA mode, e.g., to allow another STA with a higher criticality to utilize the SA RU.

13

Figure 8:
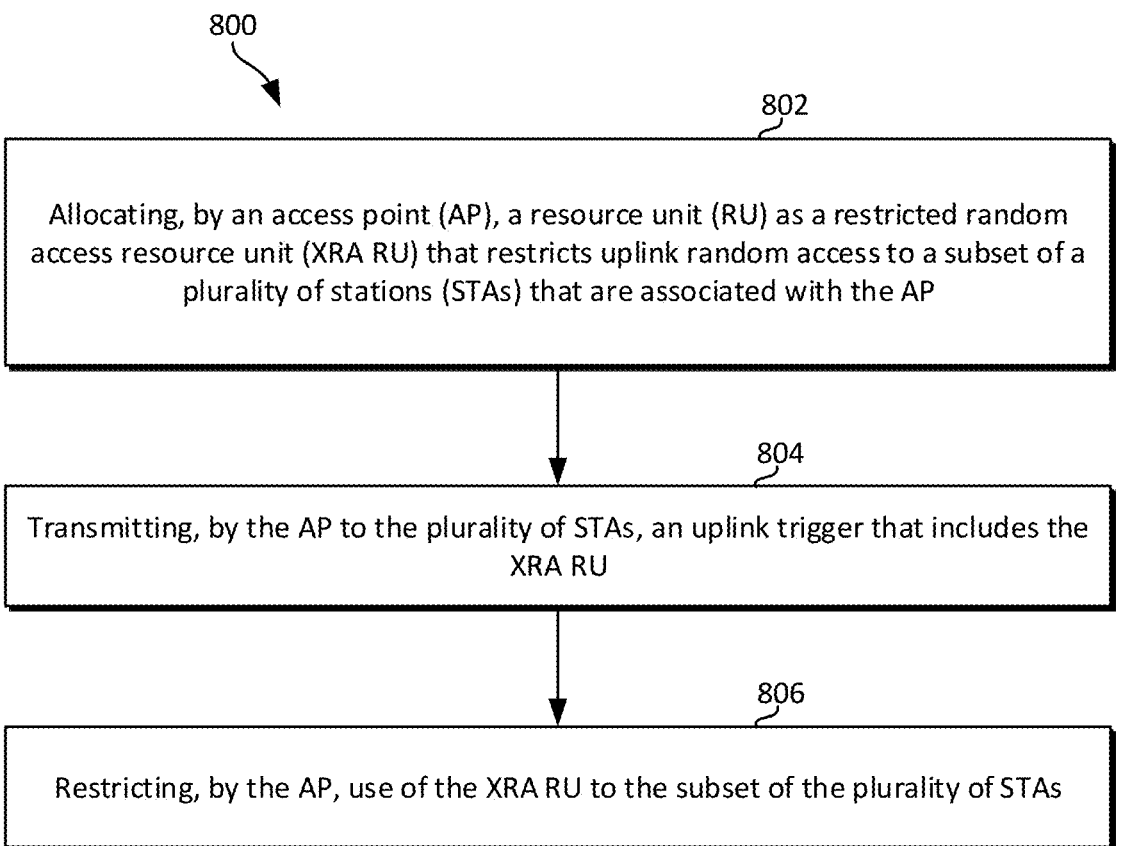
FIG. 8 is a flow diagram for a method of signaling restricted UORA access to a resource unit allocated by an AP for random access.

FIG. 8 is a flow diagram for a method 800 of signaling restricted UORA access to a resource unit allocated by an AP for random access.

At 802, the method 800 can include allocating, by an access point (AP), a resource unit (RU) as a restricted random access resource unit (XRA RU) that restricts uplink random access (e.g., using UORA) to a subset of a plurality of stations (STAs) that are associated with the AP. The subset can be a predefined set of STAs designated or permitted to attempt uplink random access with the XRA RU. The subset can include more than one STA but less than a total number of STAs served by the AP.

At 804, the method 800 can include transmitting, by the AP to the plurality of STAs associated therewith, an uplink trigger that includes the XRA RU allocated by the AP. In this way, the AP can signal to the STAs that an XRA RU has been allocated and that only STAs that are members of the designated subset can attempt contention-based random access with the XRA RU, e.g., using UORA.

At 806, the method 800 can include restricting, by the AP, use of the XRA RU to the subset of the plurality of STAs that are associated with the AP. In this regard, during an uplink, only STAs of the subset can uplink their data to the XRA RU, e.g., using UORA.

In some implementations, the uplink trigger includes an XRA RU mapping signal field, which can be a newly defined field. The XRA RU mapping signal field has one or more set ID mapping bits and one or more XRA RU mapping bits, e.g., as shown in FIG. 3. The one or more set ID mapping bits map the subset of the plurality of STAs to a set ID and the one or more XRA RU mapping bits map the set ID to the RU allocated as the XRA RU. In yet other implementations, the uplink trigger includes a user information field, which can be a preexisting field. The user information field can have one or more set ID mapping bits and one or more XRA RU mapping bits, e.g., as shown in FIG. 4. In further implementations, the method 800 can include issuing, by the AP, a beacon having one or more set ID mapping bits and one or more XRA RU mapping bits, e.g., as shown in FIG. 5. In such implementations, the subset of the plurality of STAs is established according to the mapping in the beacon. That is, the mapping provided in the beacon can be followed in the UL trigger.

In some implementations, the method can further include issuing, by the AP prior to transmitting the uplink trigger, a scheduled access status and a restricted access indicator, e.g., as shown in FIG. 6. The scheduled access status indicates one or more resource units to be allocated for scheduled access in the uplink trigger and the restricted access indicator indicates at least one attribute associated with STAs that are to be included in the subset of the plurality of STAs. In some implementations, the restricted access indicator is embodied as a traffic identifier (TID), which indicates that STAs with a type of traffic to uplink identified in the TID are set to be included in the subset in the UL trigger. In other implementations, the TID indicates one or more traffic types that are to receive a predetermined priority level in the UL trigger, and wherein the STAs having traffic to uplink having a priority level that reaches predetermined priority level are not included in the subset of the plurality of STAs. In still further implementations, the restricted access indicator is embodied as an association identifier (AID) or media access control (MAC) address, or both.

In some implementations, the method 800 can further include determining at least a function or a usage, or both, of a STA of the plurality of stations and determining a criticality level of the STA based at least in part on the function or the usage, or both, of the STA. In such implementations, when the station is at or above the criticality level, the station is not included in the subset and is provided access to a scheduled access resource unit dedicated to the STA. In contrast, when the STA is below the criticality level, the STA is included in the subset. This has the effect of pushing critical function or usage STAs to scheduled access while less critical STAs can be pushed toward random access with UORA, including restricted random access.

In some implementations, the subset of the plurality of STAs is established based at least in part on one or more user group-based requirements of a given STA of the plurality of STAs. In other implementations, the subset of the plurality of STAs is established on a per-STA basis based at least in part an association identifier (AID) or media access control (MAC) address, or both, of a given STA of the plurality of STAs.

In yet other implementations, the method 800 further includes determining, by the AP, that a status of a STA included in the subset has changed such that the STA has traffic to transmit that has a greater criticality level than previously determined. In such implementations, the method 800 can also include issuing, by the AP, an updated beacon or trigger that indicates that the STA is being removed from the subset and that a scheduled access resource unit is being allocated to the STA, e.g., as shown in FIG. 7.

In still further implementations, the subset of the plurality of STAs is established based at least in part on one or more quality of service (QoS) factors. The one or more QoS factors can include one or more of, including any combination of: a timing of traffic such that the subset of the plurality of STAs is established in a way that STAs included in the subset have or are predicted to have traffic at a same time relative to one another; a traffic class such that the subset of the plurality of STAs is established in a way that STAs included in the subset have or are predicted to have different traffic classes relative to one another; a traffic load spread such that the subset of the plurality of STAs is established in a way that a traffic load associated with a network that includes the AP and the plurality of STAs is uniformly spread, to an extent possible, over a plurality or resource units, which includes the XRA RU; and one or more learned traffic patterns associated with the network.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a non-transitory computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
allocating, by an access point (AP), a resource unit (RU) as a restricted random access resource unit (XRA RU) that restricts uplink random access to a subset of a plurality of stations (STAs) that are associated with the AP;
transmitting, by the AP to the plurality of STAs, an uplink trigger that includes the XRA RU allocated by the AP;
issuing, by the AP prior to transmitting the uplink trigger, a scheduled access status and a restricted access indicator, the scheduled access status indicates one or more resource units to be allocated for scheduled access in the uplink trigger and the restricted access indicator indicates at least one attribute associated with STAs that are to be included in the subset of the plurality of STAs, wherein the restricted access indicator is embodied as a traffic identifier (TID), which indicates that STAs with a type of traffic to uplink identified in the TID are set to be included in the subset in the uplink trigger; and
restricting, by the AP, use of the XRA RU to the subset of the plurality of STAs.

2. The method of claim 1, wherein the uplink trigger includes an XRA RU mapping signal field having one or more set ID mapping bits and one or more XRA RU mapping bits, the one or more set ID mapping bits map the subset of the plurality of STAs to a set ID and the one or more XRA RU mapping bits map the set ID to the RU allocated as the XRA RU.

3. The method of claim 1, wherein the uplink trigger includes a user information field having one or more set ID mapping bits and one or more XRA RU mapping bits, the one or more set ID mapping bits map the subset of the plurality of STAs to a set ID and the one or more XRA RU mapping bits map the set ID to the RU allocated as the XRA RU.

4. The method of claim 1, further comprising:
issuing, by the AP, a beacon having one or more set ID mapping bits and one or more XRA RU mapping bits, the one or more set ID mapping bits map the subset of the plurality of STAs to a set ID and the one or more XRA RU mapping bits map the set ID to the RU allocated as the XRA RU, and wherein the subset of the plurality of STAs is established according to the mapping in the beacon.

5. The method of claim 1, wherein the TID indicates one or more traffic types that are to receive a predetermined priority level in the uplink trigger, and wherein the STAs having traffic to uplink having a priority level that reaches predetermined priority level are not included in the subset of the plurality of STAs.

6. The method of claim 1, wherein the restricted access indicator is embodied as an association identifier (AID) or media access control (MAC) address, or both.

7. The method of claim 1, further comprising:

determining at least a function or a usage, or both, of a STA of the plurality of stations;

determining a criticality level of the STA based at least in part on the function or the usage, or both, of the STA; and wherein when the station is at or above the criticality level, the station is not included in the subset and is provided access to a scheduled access resource unit dedicated to the STA, and when the STA is below the criticality level, the STA is included in the subset.

8. The method of claim 1, wherein the subset of the plurality of STAs is established based at least in part on one or more user group-based requirements of a given STA of the plurality of STAs.

9. The method of claim 1, wherein the subset of the plurality of STAs is established on a per-STA basis based at least in part an association identifier (AID) or media access control (MAC) address, or both, of a given STA of the plurality of STAs.

10. The method of claim 1, further comprising:

determining, by the AP, that a status of a STA included in the subset has changed such that the STA has traffic to transmit that has a greater criticality level than previously determined; and issuing, by the AP, an updated beacon or trigger that indicates that the STA is being removed from the subset and that a scheduled access resource unit is being allocated to the STA.

11. The method of claim 1, wherein the subset of the plurality of STAs is established based at least in part on one or more quality of service (QoS) factors.

12. The method of claim 11, wherein the one or more QoS factors include one or more of:

a timing of traffic such that the subset of the plurality of STAs is established in a way that STAs included in the subset have or are predicted to have traffic at a same time relative to one another;

a traffic class such that the subset of the plurality of STAs is established in a way that STAs included in the subset have or are predicted to have different traffic classes relative to one another;

a traffic load spread such that the subset of the plurality of STAs is established in a way that a traffic load associated with a network that includes the AP and the plurality of STAs is uniformly spread, to an extent possible, over a plurality or resource units, which includes the XRA RU; and one or more learned traffic patterns associated with the network.

13. An access point (AP), comprising:

one or more memory devices; and one or more processors configured to perform an operation, the operation comprising:

allocating a resource unit (RU) as a restricted random access resource unit (XRA RU) that restricts uplink random access to a subset of a plurality of stations (STAs) that are associated with the AP;

causing transmission of an uplink trigger to the plurality of STAs, the uplink trigger including the XRA RU allocated by the AP, wherein the uplink trigger or a beacon issued by the AP prior to the uplink trigger has one or more set ID mapping bits and one or more XRA RU mapping bits, the one or more set ID mapping bits map the subset of the plurality of STAs to a set ID and the one or more XRA RU mapping bits map the set ID to the RU allocated as the XRA RU; and restricting use of the XRA RU to the subset of the plurality of STAs.

14. The AP of claim 13, wherein the operation further comprises:

causing, prior to transmitting the uplink trigger, issuance of a scheduled access status and a restricted access indicator, the scheduled access status indicates one or more resource units to be allocated for scheduled access in the uplink trigger and the restricted access indicator indicates at least one attribute associated with STAs that are to be included in the subset of the plurality of STAs.

15. The AP of claim 13, wherein the operation further comprises:

determining that a status of a STA included in the subset has changed such that the STA has traffic to transmit that has a greater criticality level than previously determined by the AP; and issuing an updated transmission that indicates that the STA is to be removed from the subset and that a scheduled access resource unit is to be allocated to the STA.

16. The AP of claim 13, wherein the subset of the plurality of STAs is established by the AP based at least in part on one or more quality of service (QoS) factors.

17. A non-transitory, computer readable medium comprising instructions that, when executed by one or more processors associated with an access point (AP), cause the one or more processors to perform an operation, the operation comprising:

allocating a resource unit (RU) as a restricted random access resource unit (XRA RU) that restricts uplink random access to a subset of a plurality of stations (STAs) that are associated with the AP;

determining at least a function or a usage, or both, of a STA of the plurality of stations;

determining a criticality level of the STA based at least in part on the function or the usage, or both, of the STA; and wherein when the station is at or above the criticality level, the station is not included in the subset and is provided access to a scheduled access resource unit dedicated to the STA, and when the STA is below the criticality level, the STA is included in the subset;

causing transmission of an uplink trigger to the plurality of STAs, the uplink trigger including the XRA RU; and restricting use of the XRA RU to the subset of the plurality of STAs.

18. A method, comprising:

allocating, by an access point (AP), a resource unit (RU) as a restricted random access resource unit (XRA RU)

that restricts uplink random access to a subset of a plurality of stations (STAs) that are associated with the AP, wherein the subset of the plurality of STAs is established based at least in part on one or more quality of service (QoS) factors, wherein the one or more QoS factors include one or more of:

a timing of traffic such that the subset of the plurality of STAs is established in a way that STAs included in the subset have or are predicted to have traffic at a same time relative to one another;

a traffic class such that the subset of the plurality of STAs is established in a way that STAs included in the subset have or are predicted to have different traffic classes relative to one another;

a traffic load spread such that the subset of the plurality of STAs is established in a way that a traffic load associated with a network that includes the AP and the plurality of STAs is uniformly spread, to an extent possible, over a plurality or resource units, which includes the XRA RU; and one or more learned traffic patterns associated with the network;

transmitting, by the AP to the plurality of STAs, an uplink trigger that includes the XRA RU allocated by the AP; and restricting, by the AP, use of the XRA RU to the subset of the plurality of STA.

\* \* \* \* \*